(No Model.)   3 Sheets—Sheet 1.
M. E. RHOADES.
CORN PLANTER.
No. 592,996.   Patented Nov. 2, 1897.
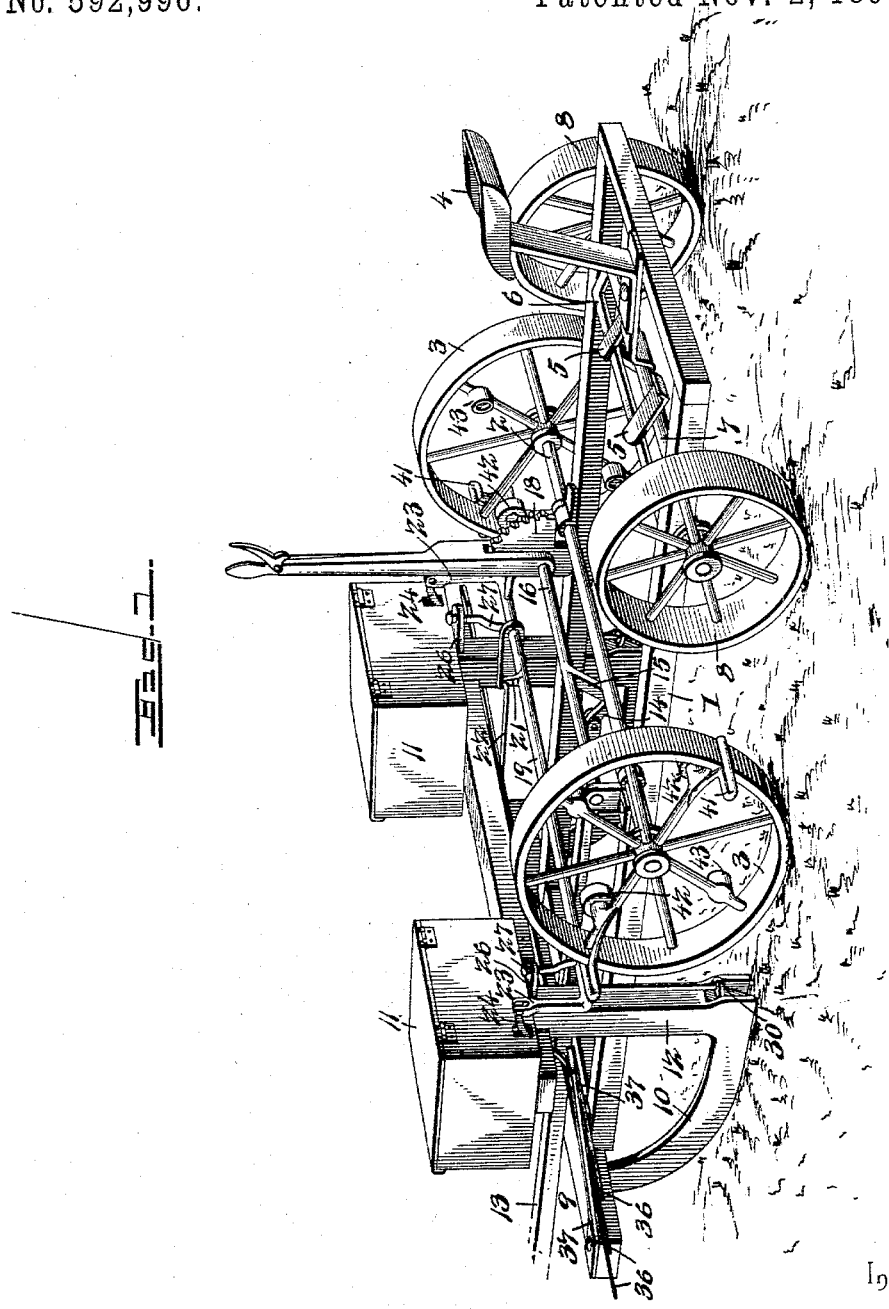
Witnesses
E. H. Stewart.
V. B. Hillyard.
Inventor
Mahlon E. Rhoades
By his Attorneys,
C. A. Snow & Co.

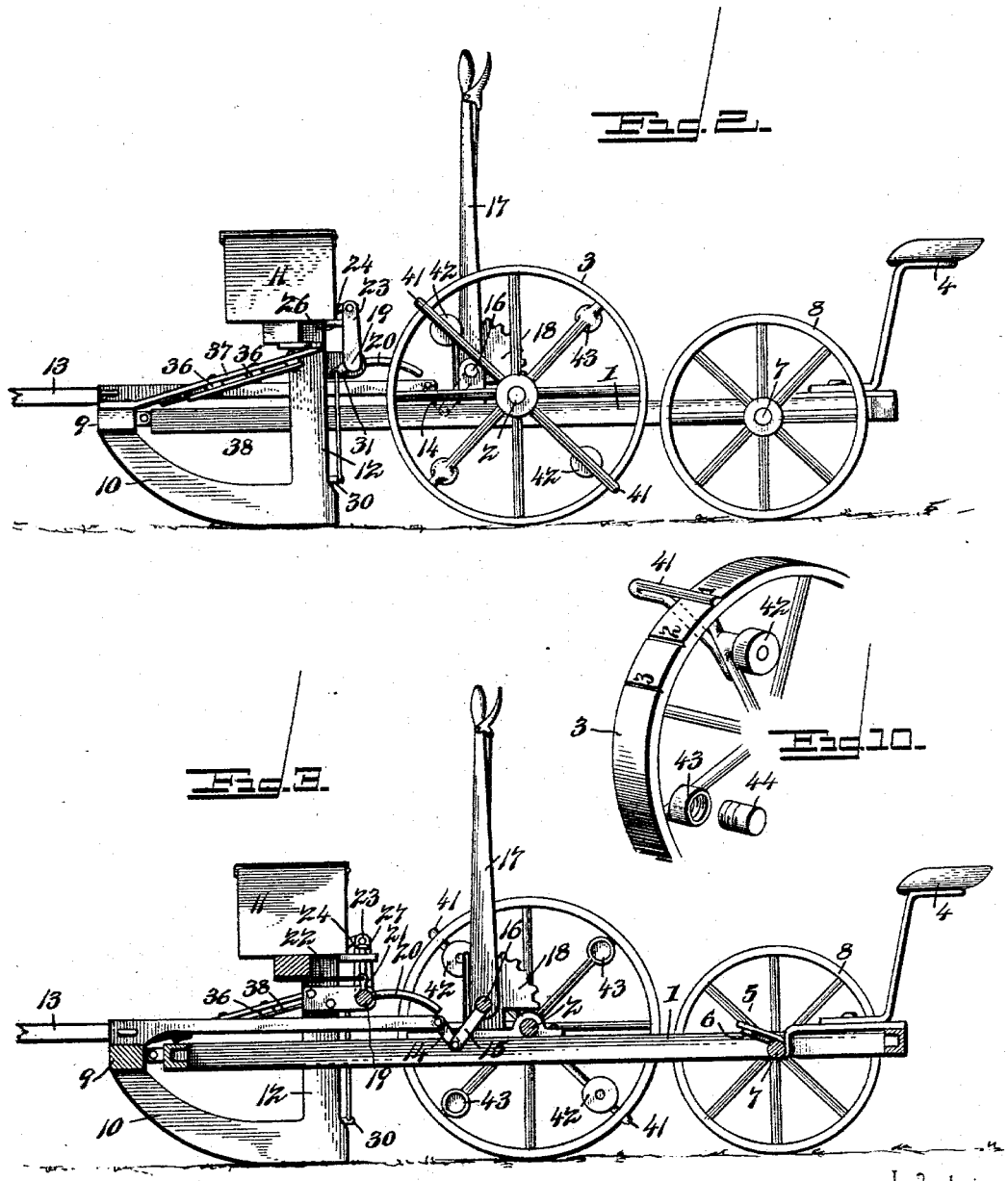

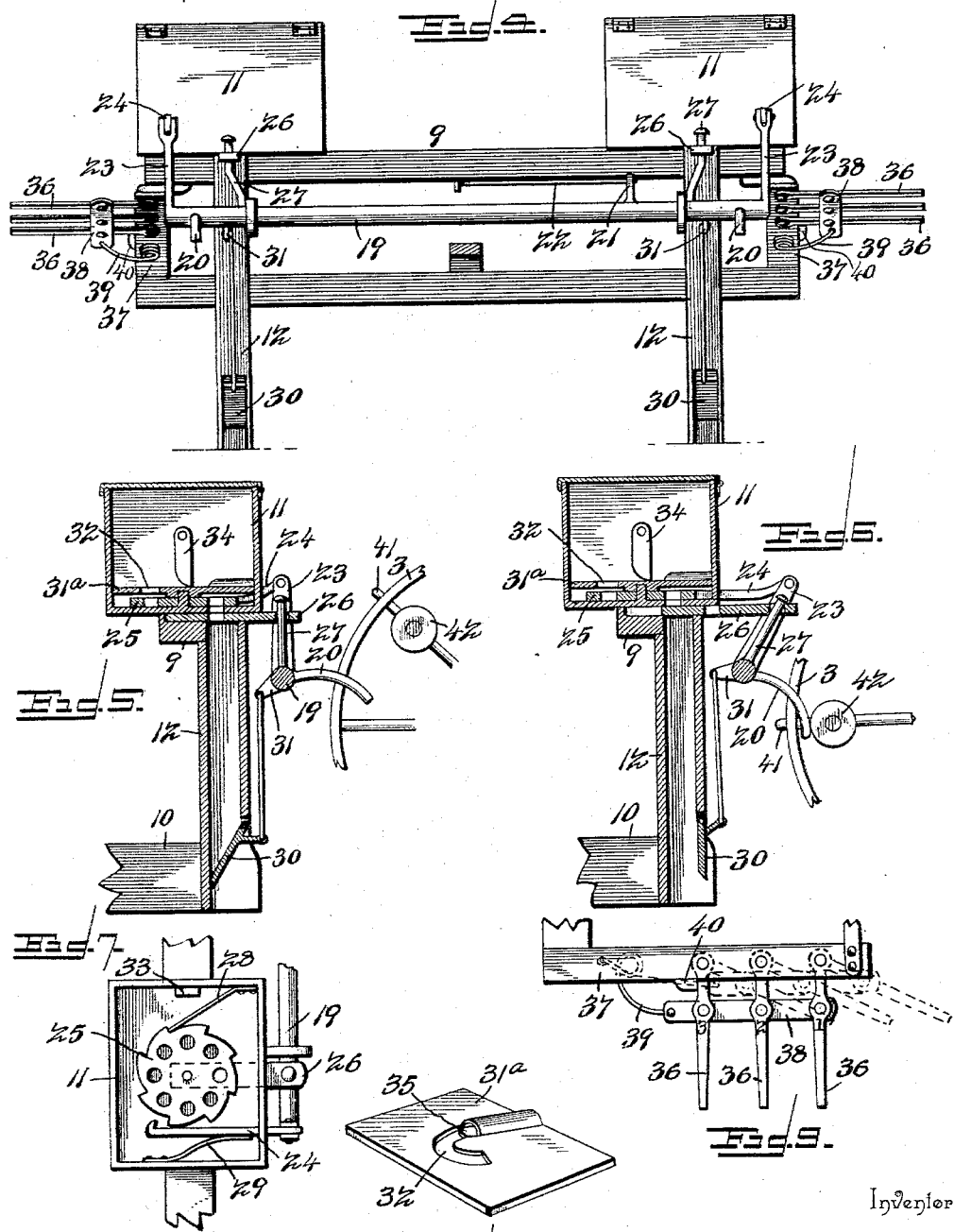

UNITED STATES PATENT OFFICE.

MAHLON E. RHOADES, OF SEDALIA, MISSOURI, ASSIGNOR, BY DIRECT AND MESNE ASSIGNMENTS, OF ONE-THIRD TO HACUPHA Z. LUSENBERRY, OF SAME PLACE.

CORN-PLANTER.

SPECIFICATION forming part of Letters Patent No. 592,996, dated November 2, 1897.

Application filed April 13, 1897. Serial No. 631,962. (No model.)

*To all whom it may concern:*

Be it known that I, MAHLON E. RHOADES, a citizen of the United States, residing at Sedalia, in the county of Pettis and State of Missouri, have invented a new and useful Corn-Planter, of which the following is a specification.

This invention relates to that class of planters for dropping corn or seed in check-rows without the use of the ordinary check-line and which is readily adapted for sowing the grain in drills without altering the mechanism, except to provide additional tappets for actuating the dropping mechanism more frequently. Combined with the planter is a marking mechanism of novel construction for accurately indicating the hills, thereby resulting in practically straight rows transversely of the field, the marking mechanism consisting of ground-wheels provided with markers, and a connected series of fingers adapted to fold so as to pass by stumps, trees, or fences without breaking or causing any injury to the planter. The fingers are designated, and like characters are provided on the ground-wheels bearing the markers and tappets whereby the said ground-wheels may be set to a position with reference to the dropping mechanism so as to indicate a result in the seed being planted in check-rows longitudinally and transversely of the field.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the improved planter. Fig. 2 is a side elevation thereof. Fig. 3 is a longitudinal section. Fig. 4 is a rear view of the runner-frame and the parts mounted thereon. Fig. 5 is a longitudinal section showing the relation of the coöperating parts for dropping the seed. Fig. 6 is a view similar to Fig. 5, showing the parts differently related. Fig. 7 is a top plan view of a dropping-plate, showing the detent and actuating-pawls. Fig. 8 is a detail view of the false bottom of a hopper. Fig. 9 is a detail view of the indicating-fingers inverted, the dotted lines showing them folded. Fig. 10 is a detailed view of a portion of a ground-wheel, showing the indicating-characters thereon and a threaded socket for receiving a removable pin, the latter being detached and arranged to one side.

Corresponding and like parts are referred to in the following description and indicated in the several views of the accompanying drawings by the same reference-characters.

The wheel-frame 1 is of rectangular form and is mounted upon an axle 2, having ground-wheels 3 secured to its ends, so as to revolve therewith, and the driver's seat 4 is provided on the rear end of the frame, as well as foot-rests 5, which are secured to a transverse bar 6 and a shaft 7, which has spindle-arms at its ends, upon which are loosely mounted covering-wheels 8, which track in the wake of the runners and seed-spouts.

The runner-frame 9 has pivotal connection with the front end of the wheel-frame and is mounted upon runners 10 of ordinary construction. The hoppers 11 are mounted upon the extremities of the rear bar of the runner-frame and the grain-spouts 12 are in line with discharge-openings formed in the bottom thereof. The pole or tongue 13 is secured to the front bar of the runner-frame and extends in the rear of the latter and is connected by means of a link 14 with an arm 15, projecting from a shaft 16, journaled in bearings on the wheel-frame, and which shaft is provided with a lever 17, having a hand-latch of ordinary construction to engage with a notched segment 18, applied to the wheel-frame, whereby the lever 17 and the wheel and runner frames are secured in an adjusted position.

A rock-shaft 19 is journaled in bearings secured to the grain-spouts and has rearwardly-extending arms 20, curving upwardly between their terminals near its ends, said arms being adapted to be engaged by tappets applied to the inner faces of the ground-wheels 3. An arm 21 extends from the rock-shaft and has a spring 22 connected therewith for holding the rock-shaft and returning it to a normal position after being actuated by the tappets. This spring 22 is secured to the runner-frame and may be of any desired form so long as it subserves the purpose for which it is provided. Arms 23 extend from the rock-shaft and are bifurcated at their outer ends to receive the outer ends of pawls 24, whereby the seed-dropping plates 25 are actuated when the planter is in operation. Seed-slides 26 have loose connection at their rear ends with arms 27, projecting from the rock-shaft, and each seed-slide has an opening which normally is in register with the discharge-opening in the bottom of the hopper and which is moved out of register with the discharge-opening upon actuating the dropping mechanism. The seed-dropping plates are of circular outline and are mounted upon pins rising vertically from the bottom of the hoppers and have teeth at their peripheral edges to be engaged by the pawls 24 and by detent-pawls 28, the latter serving to prevent the plates from turning backward when the pawls 24 are moving forward to a new position prior to operating the plates 25 when actuated. A spring 29 is had for each pawl 24 to hold it in engagement with the toothed edge of the seed-dropping plate. The seed slides and dropping plates are simultaneously actuated, and when the dropping-plate is moved to bring an opening filled with seed directly above the discharge-opening in the bottom of the hopper the seed-slide is moving to bring its opening out of register with the aforesaid discharge-opening, whereby the latter is closed and the seed prevented from discharging into the grain-spout.

A flap-valve 30 is located at the lower end of each grain-spout and normally closes the latter, and a rod connects it with an arm 31, projecting from the rock-shaft 19, whereby when the rock-shaft is turned the flap-valve is opened so as to drop the seed previously discharged thereon. When the flap-valve is open, communication is cut off between the grain-spout and the hopper by the seed-slide, and when the said valve is closed communication is established between the hopper and grain-spout, thereby permitting the grain to drop from the opening of the seed-plate 25 into the grain-spout and onto the flap-valve. By this arrangement of the parts the seed to be planted in the next hill is close to the ground, so that no time is lost in passing directly from the grain-spout into the furrow the instant the rock-shaft is actuated.

The false bottom 31ª for closing the space at the bottom of the hopper, in which are located the dropping-plate 25 and the actuating and detent pawls, has an arcuate slot 32, corresponding with the circle of openings in the seed-plate, the rear end of the slot terminating about opposite the discharge-opening in the bottom of the hopper and this false bottom is held in place by a stop 33, projecting inward from a side of the hopper and a catch 34 at the opposite side of the hopper, the stop and catch engaging over opposite ends of the said part 31ª. The false bottom has a depression in its lower face in line with the rear end of the arcuate slot 32, and a spring 35 is located in the depression and is secured at one end to the false bottom, and its front end projects slightly into the rear end of the slot 32 to prevent grain wedging between the false bottom and the seed-plate 25 and choking the latter and injuring the grain.

A series of fingers 36 have pivotal connection at their inner ends with each side bar 37 of the runner-frame and project at right angles therefrom and have pivotal connection about midway of their ends with a bar or plate 38, which is operated upon by a spring 39, by means of which the pivoted fingers 36 are held in a normal position, a stop 40, provided on each side bar 37, engaging with one of the pivoted fingers, so as to hold the series in a normal position when moved forward under the tension of the spring 39. The pivoted fingers are numbered or provided with indicating-characters which correspond with like numbers or characters on one of the ground-wheels, thereby enabling the latter to be correctly positioned with respect to the arms 20 of the rock-shaft, so that the seed-dropping mechanism may be actuated at the proper time to drop the seed in check-rows.

By having the fingers pivoted and limited in their forward movement by the stop 40 they can yield and fold rearwardly in the event of meeting with a stump, tree, fence, or other obstacle, so as to clear the same without working injury to the fingers or the planter, said fingers automatically returning to a normal position after the obstruction has been passed. When starting or when reaching the end of a row, and prior to recrossing the field, the driver observes which of the fingers is in line with the hill indicated by the marker of the ground-wheels, and the latter are turned so as to bring the corresponding mark on the graduated wheel opposite the arms 20, thereby setting the seed-dropping mechanism for planting the seed in check-rows.

Each ground-wheel 3 has markers 41 and roller-tappets 42, the latter alining radially with the markers, whereby the latter will indicate the hills of corn or other grain. In addition to the roller-tappets each ground-wheel is formed with threaded sockets 43, to which are removably fitted tappet-pins 44, which are threaded to make screw-thread connection with the said sockets. When planting in check-rows, the tappet-pins 44 are omitted, the seeding mechanism being operated by the roller-tappets 42; but when it is required to sow the seed in drills the tappet-pins are placed in position, thereby actuating the seed-dropping mechanism to effect a more rapid discharge of the grain to attain the desired end.

Having thus described the invention, what is claimed as new is—

1. In a planter, the combination of the seed-dropping mechanism, a marking mechanism, and a series of folding indicating-fingers normally projecting laterally from the side thereof for determining the relative position of the last hill of a row prior to recrossing the field, so that the seed-dropping mechanism may be properly positioned to drop the grain in check-rows, substantially as set forth.

2. In a planter, the combination of the seed-dropping mechanism, a ground-wheel provided with tappets for actuating the seed-dropping mechanism, with markers for determining the hills, and having indicating numerals or characters imprinted thereon, and a series of indicating-fingers provided with indicating-characters corresponding with those of the ground-wheel to enable the attendant determining the relative position of the last hill of a row prior to recrossing the field, whereby the ground-wheel may be turned to bring the character determined by the indicating-finger opposite the actuator of the seed-dropping mechanism to sow the grain in check-rows, substantially as specified.

3. In a planter, the combination of a connected series of pivoted fingers projecting laterally therefrom and adapted to yield so as to pass by an obstruction, a spring for returning the fingers to and maintaining them in a normal position, and a stop to limit the forward movement of the said fingers, substantially as set forth.

4. In a planter, the combination of a series of fingers pivoted at their inner ends and extending laterally in parallel relation, a bar having pivotal connection with the fingers about intermediate of their ends, a spring having direct connection with the bar for holding the pivoted fingers in a normal position, and a stop for engaging with one of the fingers to limit the forward movement thereof, substantially as set forth.

5. In a planter, the combination of a seed-dropping mechanism comprising a rock-shaft having a rearwardly-extending arm, a ground-wheel provided with markers and with tappets to engage with the said arm of the rock-shaft, said ground-wheel having designating numerals or characters applied thereto, and a series of fingers projecting laterally from the planter and marked to correspond with the designating-characters of the ground-wheel to enable an attendant to move the ground-wheel to bring the character thereon corresponding with that determined by the indicating-finger in position so that the tappets will be properly positioned with respect to the arm of the rock-shaft to drop the grain in check-rows, substantially as and for the purpose set forth.

6. In a planter, the combination of a hopper having a discharge-opening in its bottom, a seed-dropping plate operating over the bottom of the hopper, a seed-slide operating below the bottom of the hopper, and actuating mechanism for simultaneously operating the seed-slide and dropping-plate in opposite directions, whereby the discharge-opening in the bottom of the hopper is alternately opened and closed by the said plate and slide, substantially as and for the purpose set forth.

7. In a planter, the combination of a hopper having a discharge-opening in its bottom, a grain-spout in communication with the said discharge-opening, a flap-valve at the lower end of the grain-sprout, a seed-dropping plate operating over the hopper-bottom, a seed-slide intermediate of the grain-spout and hopper-bottom and below the latter, and actuating mechanism for simultaneously operating the several parts, and moving the seeding plate and slide in opposite directions at the same time, substantially as in the manner set forth for the purpose specified.

In testimony that I claim the foregoing as my own I have hereto affixed my signature in the presence of two witnesses.

MAHLON E. RHOADES.

Witnesses:
   A. EWART,
   E. H. ADAMS.